(12) United States Patent
Merry et al.

(10) Patent No.: US 7,046,804 B1
(45) Date of Patent: May 16, 2006

(54) SYSTEM FOR PRODUCING A PRINTABLE SECURITY DEVICE IMAGE AND DETECTING LATENT SOURCE IMAGE(S) THEREFROM

(75) Inventors: Trevor Merry, Nepean (CA); Ileana Buzuloiu, Ottawa (CA)

(73) Assignee: Canadian Bank Note Company, Ltd, Ontario (CA)

( * ) Notice: Subject to any disclaimer, the term of this patent is extended or adjusted under 35 U.S.C. 154(b) by 0 days.

(21) Appl. No.: 09/553,454

(22) Filed: Apr. 19, 2000

(51) Int. Cl.
G09C 5/00 (2006.01)

(52) U.S. Cl. ...................................................... 380/54

(58) Field of Classification Search ............ 283/10–80; 340/825; 380/20–65; 382/100–300; 713/176
See application file for complete search history.

(56) References Cited

U.S. PATENT DOCUMENTS

| | | | |
|---|---|---|---|
| 2,952,080 A | 9/1960 | Avakian et al. | |
| 4,092,654 A | 5/1978 | Alasia | |
| 4,198,147 A | 4/1980 | Alasia | |
| 5,178,418 A | 1/1993 | Merry et al. | |
| 5,291,243 A | 3/1994 | Heckman et al. | |
| 5,303,370 A * | 4/1994 | Brosh et al. | 380/51 |
| 5,708,717 A * | 1/1998 | Alasia | 380/51 |
| 5,734,752 A | 3/1998 | Knox | |
| 5,790,703 A | 8/1998 | Wang | |
| 5,841,886 A | 11/1998 | Rhoads | |
| 5,894,521 A * | 4/1999 | Conley | 380/54 |
| 6,104,812 A * | 8/2000 | Koltai et al. | 380/51 |
| 6,750,905 B1 * | 6/2004 | Iwami et al. | 348/222.1 |
| 2001/0033661 A1 * | 10/2001 | Prokoski | 380/258 |

FOREIGN PATENT DOCUMENTS

| | | |
|---|---|---|
| CA | 1066109 | 11/1979 |
| CA | 1172282 | 8/1984 |
| CA | 1172828 | 8/1984 |
| CH | 399 786 | 9/1965 |
| EP | 0 256 176 | 2/1988 |
| EP | 0 520 363 A1 | 12/1992 |
| WO | WO 99/35819 | 7/1999 |
| WO | WO 99/49420 | 9/1999 |

OTHER PUBLICATIONS

Graphic Security Systems Corporation, *Scrambled Indicia Technology*, brochure (undated—prior to Apr. 19, 2000).

* cited by examiner

Primary Examiner—Gregory Morse
Assistant Examiner—Ellen C Tran
(74) Attorney, Agent, or Firm—Workman Nydegger

(57) ABSTRACT

An image encoding/decoding system and method for producing a computer-generated security device which can be printed onto a document, such as a passport, to secure the document against data alteration. Deflection encoding means comprises means for applying a selected software lens to a source image and producing a deflected image. Encryption encoding means comprises means for applying an encryption function to the deflected image or a source image and producing an encrypted image. Overlaying means is provided for overlaying the deflected and encrypted images and producing therefrom the security device image. The deflected image may be detected from the security device image both by means of a manual lenticular lens corresponding to the software lens applied to a printing of the security image and by means of computer decoding processing applying the software lens. However, the encrypted image may be detected from the security device image solely by means of computer decoding processing applying a decryption function corresponding to the encryption function.

23 Claims, 5 Drawing Sheets

SYSTEM FOR PRODUCING A PRINTABLE SECURITY DEVICE IMAGE AND DETECTING LATENT SOURCE IMAGE(S) THEREFROM

FIELD OF THE INVENTION

This invention relates generally to the field of security printing and, more particularly, to an image encoding/decoding system for producing a computer-generated security device which can be printed onto a document, such as a passport, to secure the document against data alteration.

BACKGROUND OF THE INVENTION

The use of printed security indicia on identity documents is known in the industry. For example, the production of latent optically encoded images comprising overlying line deflection patterns is disclosed in each of Canadian Patent Nos. 1,172,282 to Trevor Merry and 2,071,795 to Trevor Merry et al. Another example is disclosed in U.S. Pat. No. 5,708,717 to Alfred Alasia according to which a visible source image and latent image are optically scrambled by means of a computer to produce a combined image of which only the source image is visible to the unaided eye but the latent image may be identified by applying an optical lens to the combined image. In all of these examples the latent (hidden) image is detected by means of an optical decoder comprising lenticular lenses in a physical or computerized form (i.e. through the use of either a lenticular finding screen or, possibly, a digitally represented lens pattern overlay onto a computer display). However, such latent optically encoded images provide to a document only a single level of secured identifying indicia, with the security level being determined by the optical encoding parameters.

The scope of the parameters (variables) which may be used to optically encode an image, such as in the foregoing encoding methods, is relatively narrow and limited by the physical specifications of both the printing method used to print the latent optically encoded image onto the document and the optical and physical manufacturing limitations of the lenticular finding screens which are needed to decode such latent images. Consequently, the degree of security provided by optical coding methods alone is less than the high level of security which may be required for many applications.

Therefore, there is a need in the marketplace, and the security printing industry, for an image encoding/decoding system which is able to provide different levels of security by a single printed security indicia applied to a document including a high level of security.

SUMMARY OF THE INVENTION

In accordance with the invention there is provided a computer operated encoding system and method for producing an electronic security device image from one or more electronic source images, the security device image being adaptable for printing onto a document to secure the document against data alteration. Deflection encoding means comprises means for applying a selected software lens to one of the source images and producing a deflected image. Encryption encoding means comprises means for applying an encryption function to the deflected image or one of the source images and producing an encrypted image. Overlaying means is provided for overlaying the deflected and encrypted images and producing therefrom the security device image whereby the deflected image may be detected from the security device image both by means of a manual lenticular lens corresponding to the software lens applied to a printing of the security image and by means of computer decoding processing applying the software lens and the encrypted image may be detected from the security device image solely by means of computer decoding processing applying a decryption function corresponding to the encryption function.

Preferably the security device image includes a plurality of deflected images, the deflected images being interlaced to form an interlaced image and the interlaced image being overlaid with the encrypted image. The software lens may be selected from the group comprising line lenses, curved lenses and bitmap lenses.

Also in accordance with the invention there is provided a computer operated decoding system and method for identifying one or more latent source images from a security device image comprising at least an encrypted image and a deflected image which are overlaid. Separating means are provided for separating the overlaid encrypted and deflected images. Decryption decoding means comprises means for applying to the encrypted image the decryption function corresponding to the encryption function used to produce the encrypted image and producing therefrom a decrypted image, the decrypted image corresponding either to one of the source images or a deflected image. Deflection decoding means comprises means for applying to the deflected image, or to the decrypted image if the decrypted image corresponds to a deflected image, a software lens corresponding to the software lens used to produce the deflected image and producing therefrom a deflection decoded image.

Preferably, aligning means are provided for aligning the software lens with the deflected image to identify whether one of the source images corresponds to the deflection decoded image. The aligning means preferably comprises evaluation means for evaluating whether the deflection decoded image corresponds to the source image, wherein the evaluation means operates iteratively with the deflection decoding means to apply on each iteration either a different position of the software lens or other different lens parameter, until either the decoded image is determined to correspond to the source image or all available lens positions and/or parameters have been applied. The evaluation means may use a scoring algorithm to calculate a score based on pixel statistics calculated for each iteratively produced deflection decoded image. The deflection decoded image is determined to correspond to the source image when a relatively large change occurs in the score from one iteration to the next. The system may further comprise means for outputting either the deflection decoded image when it has been determined to correspond to the source image or an error message if no such determination is made.

Advantageously, the security device image may be customized to identifying features of the individual document onto which the device is to be printed and at any time, at the election of the user, can either be manually or electronically decoded using an optical lens to achieve one level of security or electronically decoded using a decryption code to achieve a higher level of security. As such, the required level of security in any given circumstance may be employed at the election of the user without interfering with the ability of other users to at any time employ another level of security provided by such document.

DESCRIPTION OF THE DRAWINGS

The present invention is described in detail below with reference to the following drawings in which like reference numerals refer throughout to like elements.

DETAILED DESCRIPTION OF A PREFERRED EMBODIMENT

The encoding system of the invention for producing a security device can be implemented by computer processing only. The decoding of the security device, however, can be implemented either by computer processing or by manually applying an optical decoding lens to the security device, the choice of decoding means being at the election of the user, to be decided on the basis of the circumstances of the user (such as whether the user's location provides access to a suitable computer system or, instead, only physical finding screens) and the level of security the user wishes to utilize.

The encoding system produces a security device which is a combination of encoded images one of which is a latent image detectable by means of a lenticular lens and another of which is a latent image detectable only by means of computer decoding processing utilizing an electronic key (i.e. decryption code). The user is thereby provided with a printable security device which can be used to achieve two different levels of security for a document solely on the basis of the choice of the user and without interfering with the ability of others to at any time utilize the other level(s) of security provided by the device.

Figure 1:
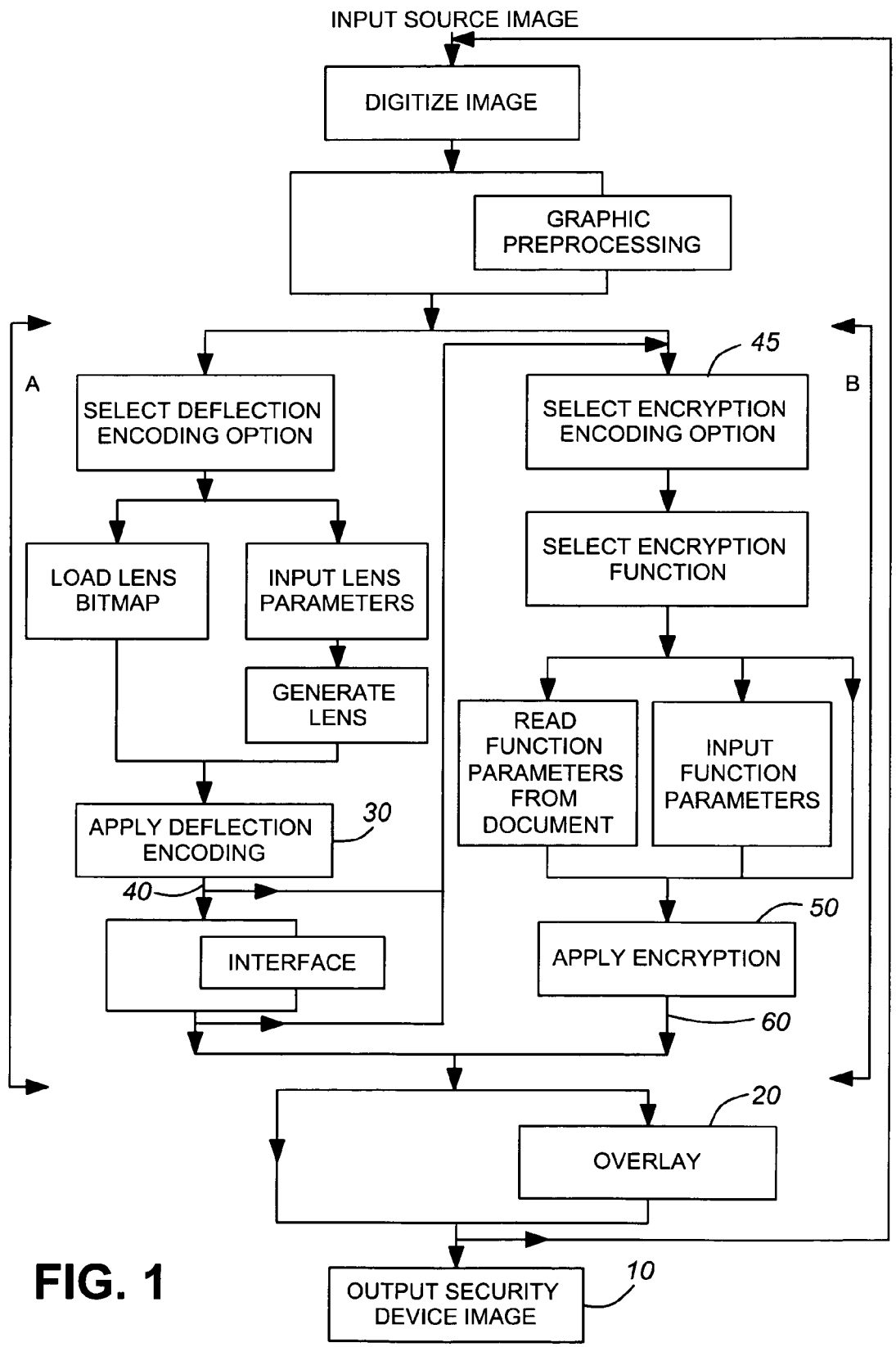
FIG. 1 is a block diagram of an image encoding process in accordance with the invention.

The security device 10 is the encoded electronic image produced by the encoding process of the invention the steps of which are illustrated in block diagram form by FIG. 1. As shown by FIG. 1 the encoding process, in its simplest form, comprises the steps A to encode a latent deflected image and the steps B to encode an encrypted image based on the deflected image followed by an overlay step 20 whereby the two encoded images (i.e. the deflected image 40 and the encrypted image 60) are overlaid to produce the security device image 10. In the example shown by FIG. 4 the encrypted image 60 is based on the deflected image 40 and represents a second layer of encoding applied to that deflected image in that it is the optically encoded deflected image which is then further electronically encoded by means of an encryption function 70 applied to it.

Figure 2:
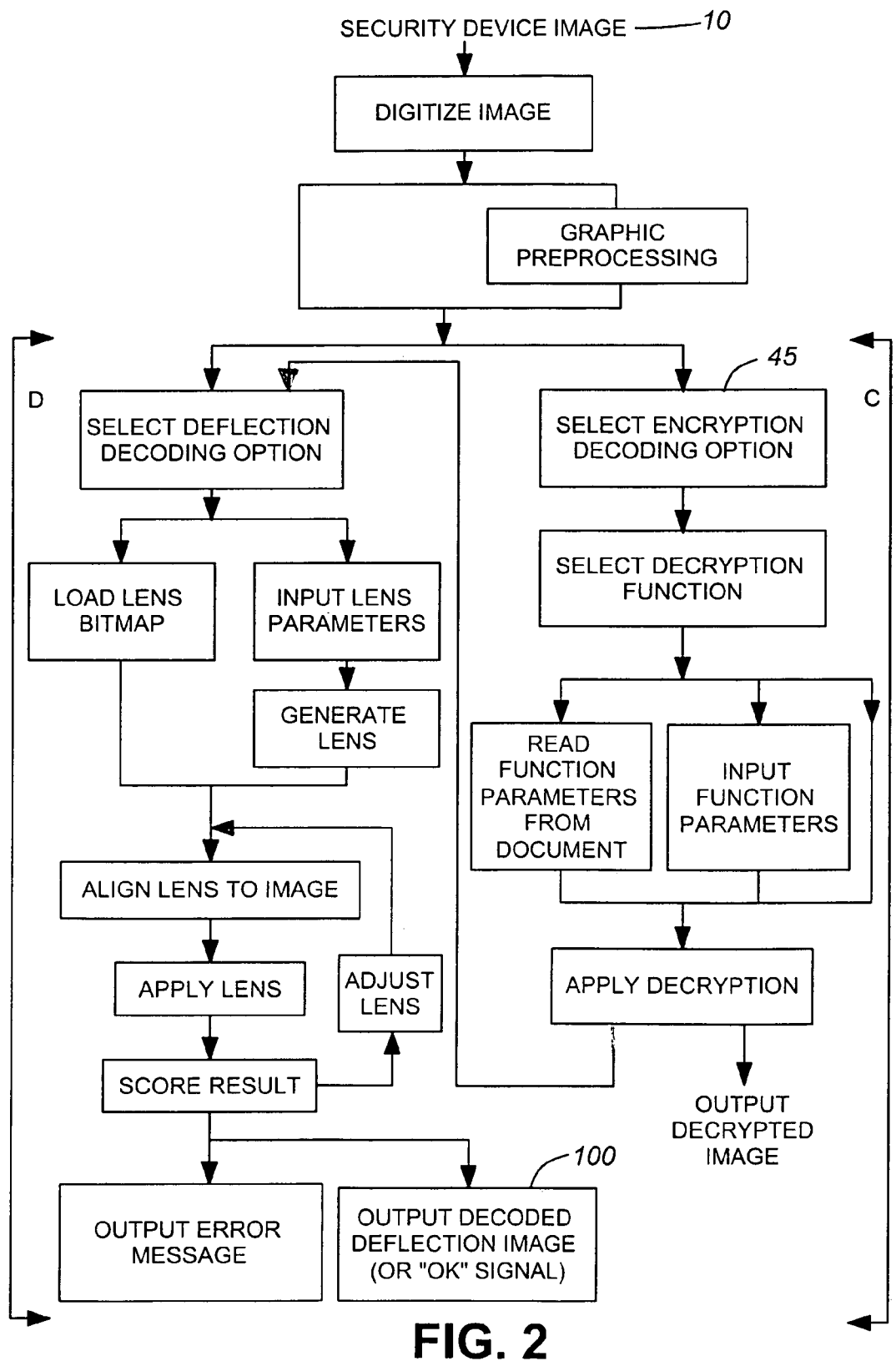
FIG. 2 is a block diagram of an image decoding process which decodes the encoded image produced by the encoding process of FIG. 1.
Figure 4:
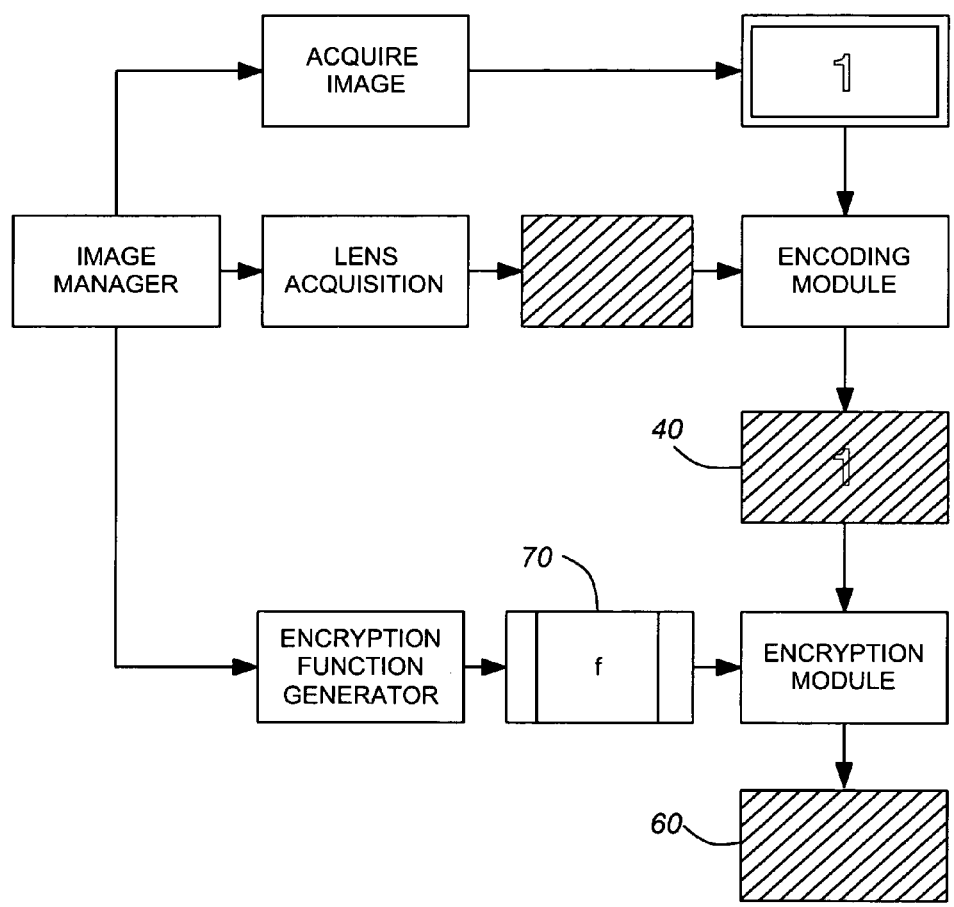
FIG. 4 is a block diagram showing one example of input and output images obtained through execution of the encoding module of the system of FIG. 3; and, FIG. 5 is a block diagram of a software system which implements the decoding process of the invention.

FIG. 2 illustrates the process for fully decoding the security device image 10 which was produced through the encoding process shown by FIGS. 1 and 4. The highest security level decoding process is achievable only through the use of decoding software which implements the steps C, as illustrated, whereby the encrypted image is first decrypted using the assigned decryption function as applied by the encoding process, and steps D whereby then the resulting decrypted image is further optically decoded by means of a software lens which applies to the decrypted image the lens used for the encoding process, in order to result in the identification of the decoded (i.e. source) image 100. The separation of the overlaid encrypted and deflected images takes place within the decryption process itself.

At the same time a second, lower security level decoding process is available for decoding the security device image 10 and this uses only a physical lens (not shown in the drawings) having the same parameters as the said assigned lens (i.e. the lens applied in steps D of the process of FIG. 2). According to this decoding process the latent deflected image is detected by hand (without need for computer software) using a simple lenticular finding screen incorporating the assigned lens, as is well known in the art and described, for example, in the aforementioned Canadian Patent No. 1,172,282 the contents of which is hereby incorporated by reference. By this manual decoding process only the deflected image is identified and the encrypted image of the security device (which provides a higher level of security) is not utilized.

The deflected image 40 which results from the application of the deflection encoding steps by the software is an optically encoded image. The deflection encoding step 30 uses a software lens which is applied to the source (input) image (after the source image has been digitized and graphically processed to render it compatible with the graphics parameters used by the particular computer software to be employed) to cause the source image to be broken into separate image elements. The source image may be any image such as a photograph, graphics, a bar code, etc. The image elements could be lines, curves or any other shape, their shape and frequency being determined by the software lens which is applied to the image.

The software lens could be any pattern, the most simple being a parallel line lens which is the typical pattern of hand-held finding screens. Preferably, however, to provide an increased level of security by the deflected image itself, the software lens is mathematically generated and is characterized by shape, and other parameters which are used to control the result of the deflection procedure. Shape indicates the geometric distribution of the separate elements that will form the deflected image (e.g. parallel lines, variable frequency parallel lines, distorted lines, etc.) while the other parameters give a quantitative description of a specific shape (e.g. line frequency, distortion factor, etc.) or a description of the deflected image elements (dotted, dashed, continuous, character lines, etc.). Alternatively, the assigned software lens may be defined by a specific bitmap rather than be mathematically defined. Examples of possible lens are illustrated below under Table A wherein item (a) represents a lens having a fixed line frequency and line angle of 45 degrees, item (b) represents a circular lens having a diameter d and distortion factor f and item (c) represents a bitmap lens.

TABLE A

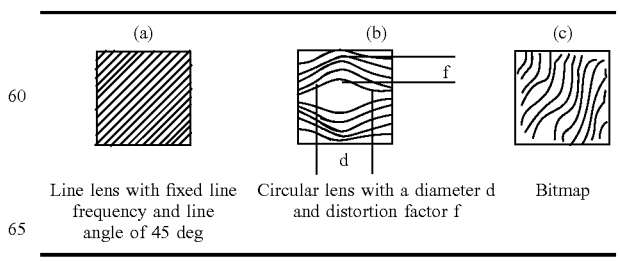

Line lens with fixed line frequency and line angle of 45 deg | Circular lens with a diameter d and distortion factor f | Bitmap The software lens may also be personalized to the particular document onto which the security device is to be printed by using, as a lens parameter, selected identifying data associated with the document such as a personal identification number. However, if this were to be done the option of manually employing only the lowest security-level feature of the device 10, by using a lenticular finding screen to manually identify the latent deflected image, would be rendered impracticable because too many personalized finding screens would then be required rather than one generally applicable finding screen.

The deflected image is produced by applying the selected lens to the digitized, processed source image so that the source image is broken into separate image elements that follow the lens geometry and the width of those image elements is defined by the line frequency of the deflection lens. The shape of the image element is determined by the type of lens used (i.e. the elements would be straight lines if a straight line lens is used, curved lines if a curved line lens is used, etc.). The chosen source image may be any image that is desired for use as a latent image, the source image shown in FIG. 4 being the numeral "1". The image elements (i.e the broken elements produced by applying the lens to the source image) are then combined with the lens elements so that the lens elements are deflected each time an image element is encountered. The resulting latent deflected image becomes visible to the eye only if the same lens is applied to the deflected image and only if it is applied in the correct position such that the lens overlays the lens elements of the deflected image. When the lens is positioned accordingly over the deflected image the original source image becomes visible because the lens elements are then eliminated from the deflected image.

Table B below illustrates the steps by which a software lens comprised of fixed frequency curved lines (item(b)) is applied to a source image (item (a)). The lens geometry (item (c)) determines the image elements (item (d)) and the image elements and lens elements are combined to produce the deflected image (item (e)).

TABLE B

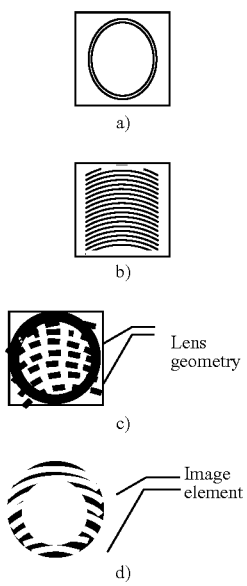

TABLE B-continued

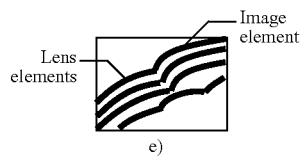

If desired, two or more of the deflected images produced by steps A (FIG. 1) may be combined into a composite deflected image by interlacing the individual deflected images (with each individual deflected image having been produced using the same or different lens). This is done digitally by merging into a single bitmap the individual bitmaps defining the deflected images which are to be interlaced.

The encrypted image 60 resulting from the encryption encoding step 50 is electronically encoded by means of one or more assigned encryption functions and, as such, is identifiable only by means of electronic decoding using the same assigned encryption function(s). As shown by FIGS. 1 and 4 the image 45 which is encrypted to produce the encrypted image 60 may be a deflected image 40 produced by means of steps A or an uncoded, digitized and pre-processed image such as a person's photograph.

The encryption encoding step 50 consists of applying a selected mathematical function to the binary representation of the image 45 (the binary representation being a sequence of bytes). As a result of this the bytes defining the image are altered and the altered (encrypted) bytes, when presented in visual form as a bitmap, represent the encrypted image 60 which has no visible relevance to the original image 45. The only means of visually determining the image 45 from the encrypted image 60 is to apply to the altered bytes the reverse of the assigned encryption function. Therefore, this encryption procedure produces images that are detectable only by computer means.

The mathematical encryption function to be selected for use by the encryption encoding step is unrestricted. To provide an additional security feature to the security device 10 one or more parameters of the encryption function may be correlated to a personal (or individual) identifying feature of the document onto which the security image is to be printed. For example, one function parameter could be the personal identification number of the document (such as the passport number in the case of a passport). Specifically, the encryption function may be represented as follows:

$f(x,m)$ where, $x$=the input variable (e.g. the current byte of the source image) and, $m$=a function parameter (e.g. a personal identification number associated with the document)

Thus, the function parameter m which is required by the encryption encoding step would be supplied at the time the personal data pertaining to that particular document is entered into the computer. Then, when the document is processed for security analysis the decryption step uses the identification number appearing on that particular document and, if the source image is not output as a result of the decryption process, it is then to be concluded that the document is not authentic.

The encrypted image 60 resulting from the encryption encoding steps B and one or more deflected images 40 resulting from the deflection encoding steps A are overlaid to produce the security device 10. By overlaying these images a visually combined image is produced but the individual bitmap pertaining to each image is preserved and identifiable by means of a feature which is distinct to that bitmap such as colour. For example, a bitmap defining an encrypted image 60 is printed in one colour and an overlaid bitmap defining a deflected image 40 is printed in a contrasting colour such that each bitmap may be individually (separately) identified through appropriate scanning and computer processing.

The image 10 defining the security device is decoded by the decoding process shown in FIG. 2 according to which the image 10 is first digitized to render it computer readable. The image is then graphically pre-processed to render the data compatible with the particular graphics software utilized by the decoding software and to separate out the colour planes of the image which, in turn, separates the overlaid images into discrete images for separate decoding. To decode the highest-level security feature of the security device the decryption process steps C are applied to the encrypted image of the security device to identify the encrypted image and the result is either input to the deflection decoding software to apply to it the deflection decoding process steps D (if the encrypted image is a deflected image) or output as a source image (if the encrypted image is a source image).

Figure 3:
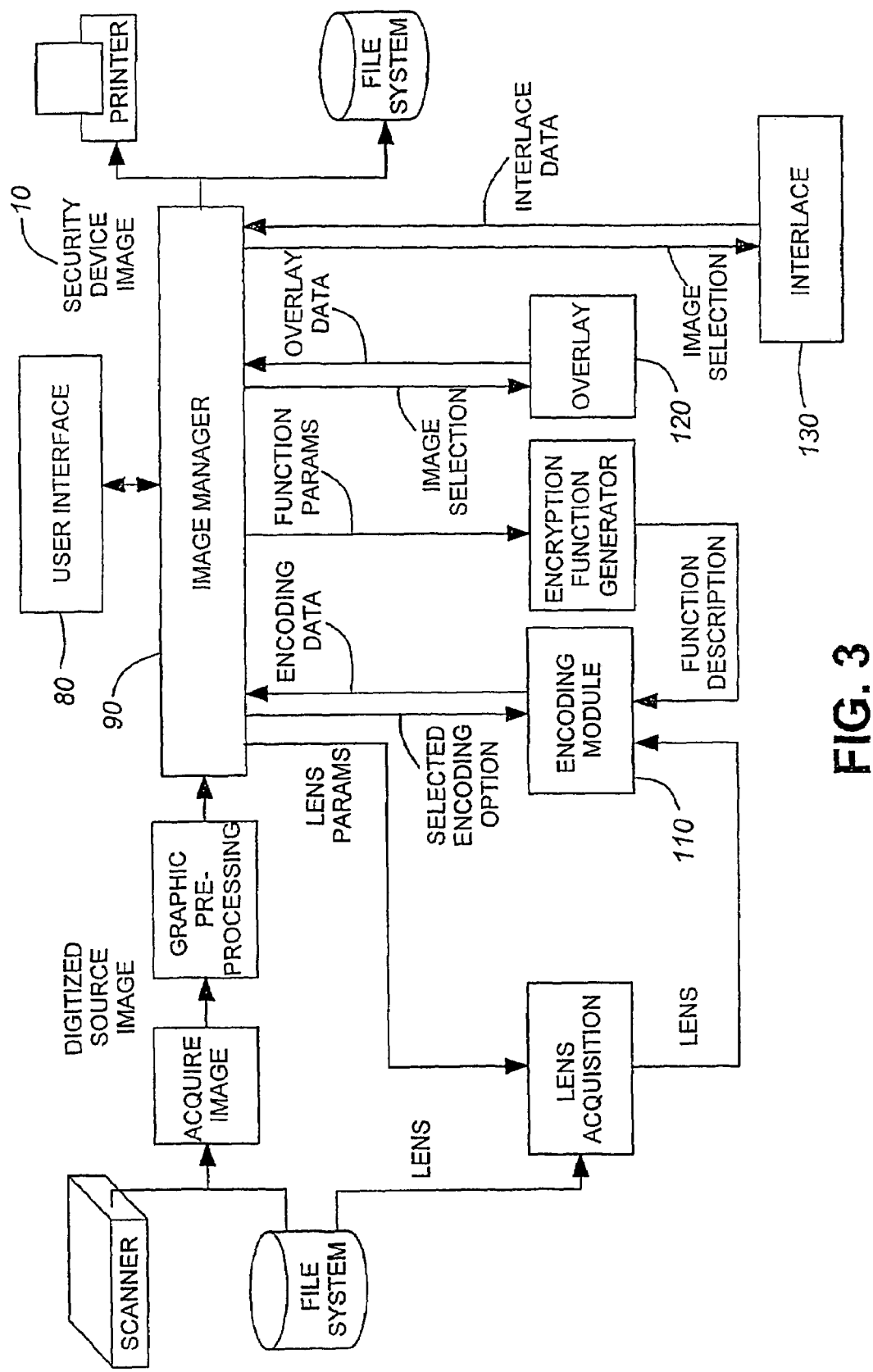
FIG. 3 is a block diagram of a software system which implements the encoding process of the invention.

FIG. 3 illustrates the software modules of the image encoding system. As shown, the security device image 10 is created by successively overlaying encoded images, referred to herein as image components, each of which is encoded separately and without restriction as to the specific encoding procedure used. The image components could be any type of image, as desired, including deflected and encrypted images as described herein, bar codes (printed using visible or invisible ink, the latter being ultra-violet or infra-red light sensitive) and/or a visible photograph bitmap (and/or variable text data) which might be used for the background of the security device image.

As shown in FIG. 3 each source image that is to be added as a security device image component is input in digital form either by scanning the image or by loading a bitmap file (which may have been created using any other graphic application) and the appropriate graphic pre-processing steps are applied to the digitized image to render it compatible with the encoding software. The encoding option, being either deflection or encryption, is selected by the user through a user interface module 80 which interfaces the user to an image manager agent 90. The image manager agent 90 controls the operation of the various software components of the encoding system. As is well-known in the art an agent is a segment of computer software which can be autonomous and/or mobile and may be implemented as a component or object. (Agents are able to interact with their environment and to act both proactively and reactively). The terms "component" and "module" herein refer to a set of computer-readable instructions or commands and are not limited to any specific architecture or location.

The selected encoding process is input to the encoding module 110 together with the particular encoding parameters which are needed for the selected encoding. If deflection encoding is selected a description of the lens is provided either by loading a lens read from a file or by setting the parameters to be used in generating the lens as described above. If encryption encoding is selected the encryption function is generated and both the mathematical function and the function parameters are input to the encoding module 110. The output image produced by the deflection encoding process may be further processed as input to the encoding module for further encryption encoding and/or as one image component to be overlaid with others to form the security device image 10. The output image produced by the encryption encoding process is itself processed as another image component of the security device image.

The image components produced by the encoding module 110 are combined using the overlay module 120 and before doing so one or more of the image components may be combined by interlacing, using the interlace module 130, as described above. When interlacing is selected the system provides the support for selecting an appropriate frequency for the deflection encoding lenses based on the number of images to be interlaced. The manner by which multiple deflected images may be interlaced is well-known by persons in the art as are the frequency limitations which apply to such interlacing.

When all desired image components have been overlaid to produce the image 10 the security device (which is defined by the image 10) may be printed onto a document and/or stored in a file system.

Figure 5:
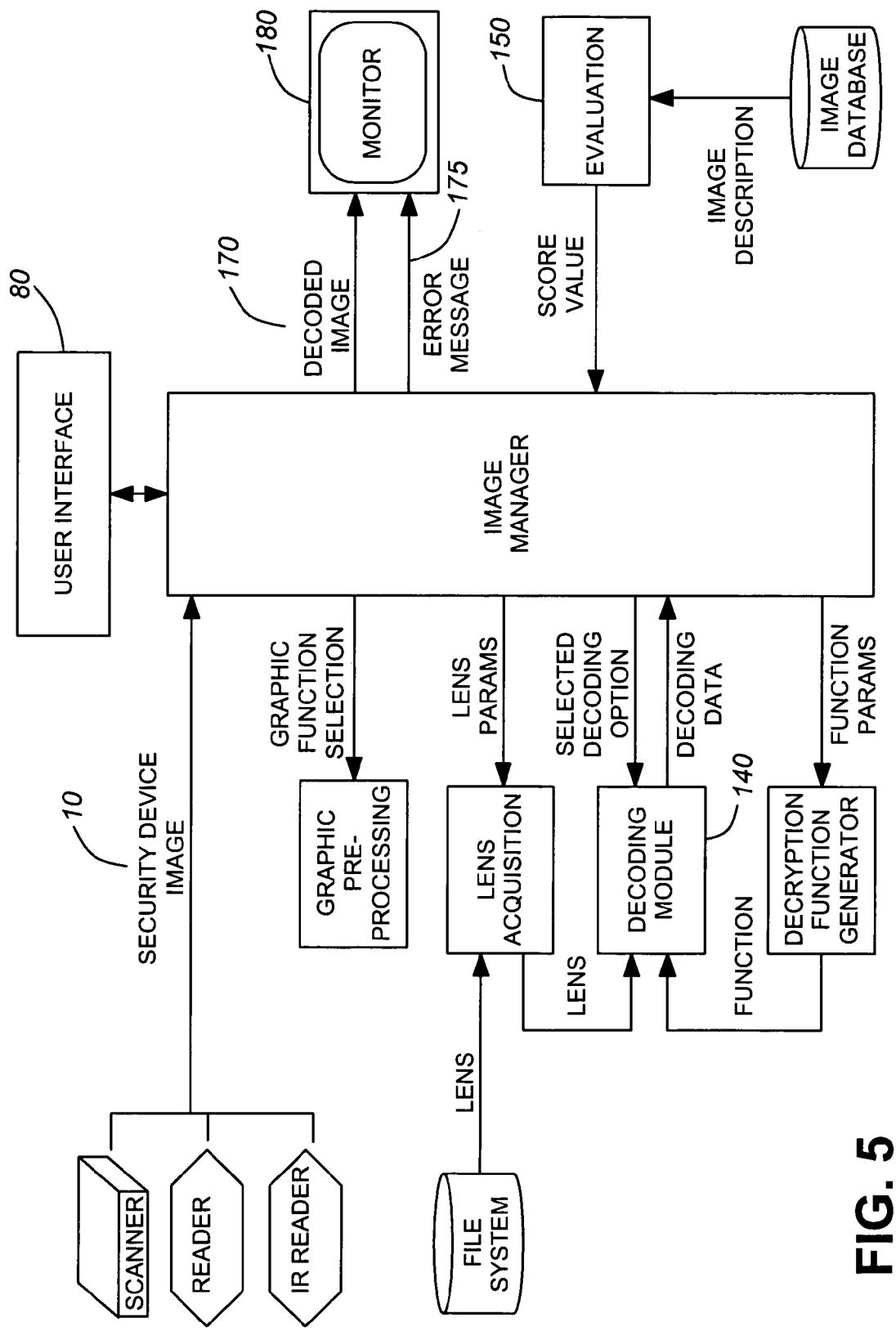

FIG. 5 illustrates the software modules of the image decoding system which, as shown, are for the most part symmetric to those of the encoding system except that the input image is the security device image instead of a selected source image and the deflection decoding process of the decoding module 140 necessarily includes an alignment component because, as is well-known by persons skilled in the art, the exact alignment of the assigned lens with the lens elements of the deflected image is critical to the identification of the deflected source image. This alignment component is needed to ensure that any failure of the decoding module 140 to identify a deflected image is due to the fact that the document is not authentic and not simply because a misalignment of the decoding lens failed to reveal the source image. Because it is critical that the lens be exactly aligned the decoding software must be able to evaluate and correct the alignment, as needed, just as effectively as a person is able to do using a manual lenticular finding screen (i.e. whereby one slowly moves the lens over the printed deflected image to change the position of the lens until the deflected source image either appears (thereby identifying an authentic document) or does not appear (thereby identifying an unauthentic document)). Therefore, the function of the alignment module is to simulate, by computer processing means, the necessary step of aligning the "finding lens" over the deflected image so that the image elements of the deflected image become visible and the encoded (source) image thereby appears.

The correct positioning of the software lens may be achieved by applying detectable, fixed registration marks to the deflected image at the time it is produced so that the decoding lens may simply be aligned in a predetermined manner with respect to those registration marks. Alternatively, if registration marks are not desired, an evaluation module 150 utilizing a scoring technique is applied as shown in FIG. 5 and Table C and described below. On successful identification of the (known) encoded image the decoded image 170, being the source image, is displayed on a monitor 180. On a failure to identify the encoded image an error message 175 is displayed on the monitor 180.

The bitmap produced through the deflection decoding process of the decoding module 140 is automatically evaluated by the evaluation module 150 to identify the presence or absence of an encoded source image. If the evaluation module 150 calculates an evaluation score value which is not satisfactory the deflection decoding process is repeated on an iterative basis, using gradually adjusted lens parameters (depending on the lens type), and the bitmap resulting from each iterated deflection decoding process is reevaluated until a satisfactory score value is reached or all adjustment possibilities have been applied in which case it is concluded that a source image is not present and, therefore, the document is not authentic.

Because a correct positioning of the lens will cover the line segments that are not a part of the source image itself, a sudden drop in the score function will indicate that the correct position of the lens has been recorded. This is illustrated below under Table C in which offset 1 (which is approaching but not quite at the correct position for the lens) is shown to produce a relatively high score value and offset 2, representing the correct lens position in which the source image (the numeral "1") is clearly visible, is shown to produce a much lower score value.

segments which are not too scattered and whose number do not exceed a certain limit. The scatter factor and maximum number of image elements are adjustable during the scoring process, and they also depend on the complexity of the encoded image as well as on the lens frequency. For example, a higher lens frequency will require a larger maximum number of image elements to be designated because the source image would then be defined by a larger number of image elements.

The steps taken by the evaluation module 150 are the following, with reference to the example which is provided by Table E below for purposes of illustration:

1. Initiate score value with a maximum value S. Since the score value is calculated on pixel statistics (taking the simplest example, this could be the total number of pixels that are revealed during the current evaluation step) this initial value could be considered to be the total number of

TABLE C

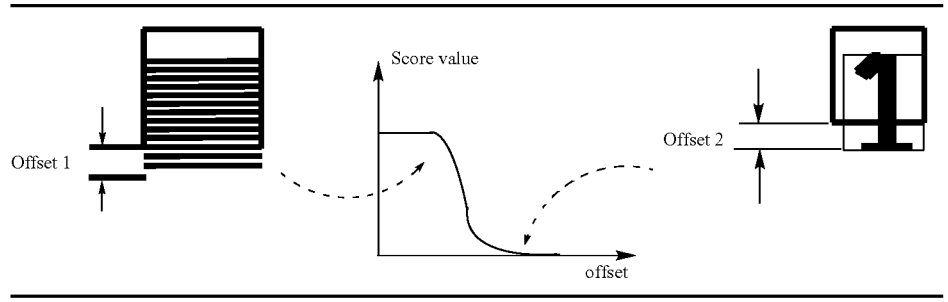

Even if registration marks are used to accurately position the lens this scoring technique can still be used advantageously to determine the correct lens parameters since in some cases the offset (i.e. lens position) may be correct but one of the lens parameters, such as frequency, may be incorrect. To do so, for a given lens position, the lens frequency is increased gradually until a desired score value is reached.

The scoring algorithm used by the evaluation module 150 is based on pixel statistics and does not depend on the lens type. The image is decomposed into groups of pixels. A scoring function defines a scatter factor and a maximum number of image elements. The scatter factor represents the area of the largest pixel group divided by the total bitmap area. A very small scatter factor indicates that pixels are very scattered (indicating the image is composed of very small area groups). The maximum number of image elements represents the number of distinct pixel groups identified in the bitmap. Table D below shows the relative element numbers and scatter factors assigned to two very different images using this technique.

TABLE D

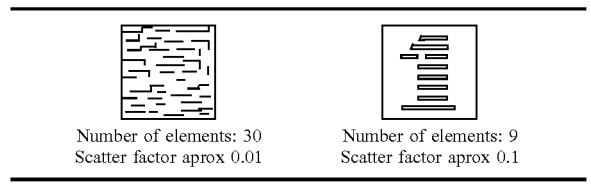

The assumption made by the scoring algorithm is that an image will be relevant if it is formed of distinct image pixels that the deflected image contains. Let this be S=200 for purposes of this example.

2. Generate software lens L (presumed to be the correct one). The lens shape is chosen to be parallel line lens with a line frequency of 69 dpi for this example.

3. Overlay lens L and bitmap B using offset O for the lens. Initiate O with O1=zero. Overlay means that all necessary preparations are being done to apply the deflection decoding to bitmap B, using lens L, but the decoding itself is performed during the next step, called 'apply lens'.

4. Apply lens to obtain resulting decoded image R=R1. Image R1 represents the output of the deflection decoding procedure, but it does not necessarily reveal an acceptable image. According to the physical phenomena that the software lens is simulating, the result of applying a linear lens to a deflected image will be that only some portions of the bitmap B will become part of the decoded image R. In this example, these portions are stripes' because chosen lens is linear but for a different lens shape the fragments would follow that particular lens shape.

5. Calculate score value S1 for image R1. Following this simple chosen example, the pixels in image R1 are counted and an S1 value is assigned as S1=180.

6. Compare S1 to S2. If the ratio S2/S1 is greater than a preset limit D (for example, set D=⅓) then it is decided that either the lens has not been properly aligned or has not been properly chosen. The limit D can be adjusted, and the intention is that D must reflect the ratio between the total bitmap area (B) and the area of the source image sought. In this example, the ratio 180/200 is greater than ⅓ and, therefore, it is necessary to return to step 3 and adjust the value of offset O.

7. Iterations 2 and 3 shown below in the example provided by Table E use two different offset values O2 and O3 respectively, where O1<O2<O3. Decoded image R2 generates, for example, a score value S2=143, while decoded image R3 generates, for example, a score S3=58. For the third iteration, because 58/200 is less than ⅓ (the value assigned to limit D), the evaluation module decides that offset O3 correctly aligns the lens.

8. The decoded image R3 is further evaluated to decide whether it actually contains the source image. As described above with reference to Table D, a pixel statistics scoring algorithm is applied by calculating the scatter factor and number of elements. For this example a scatter factor F=0.1 and number of elements N=10 are assigned and these values are compared to preset limits Fmin=0.02 and Nmax=20. Since F>Fmin and N<Nmax the evaluation module accepts the image R3 as being the source image.

Additional evaluation criteria may also be used to ensure that the resulting image is correct and represents an authentic document such as comparing the accepted image bitmap against the personal identification number, visible portrait or other biometric printed on the document if one of these was the source image, or comparing other data obtained from another source such as downloaded from a file or verbally supplied by the document bearer.

What is claimed is:

1. A computer operated system for producing an electronic security device image from one or more electronic source images, said security device image being adaptable for printing onto a document to secure said document against data alteration, said system for producing comprising:

(a) deflection encoding means comprising means for applying a selected software lens to a first said source image and producing a deflected image;

TABLE E

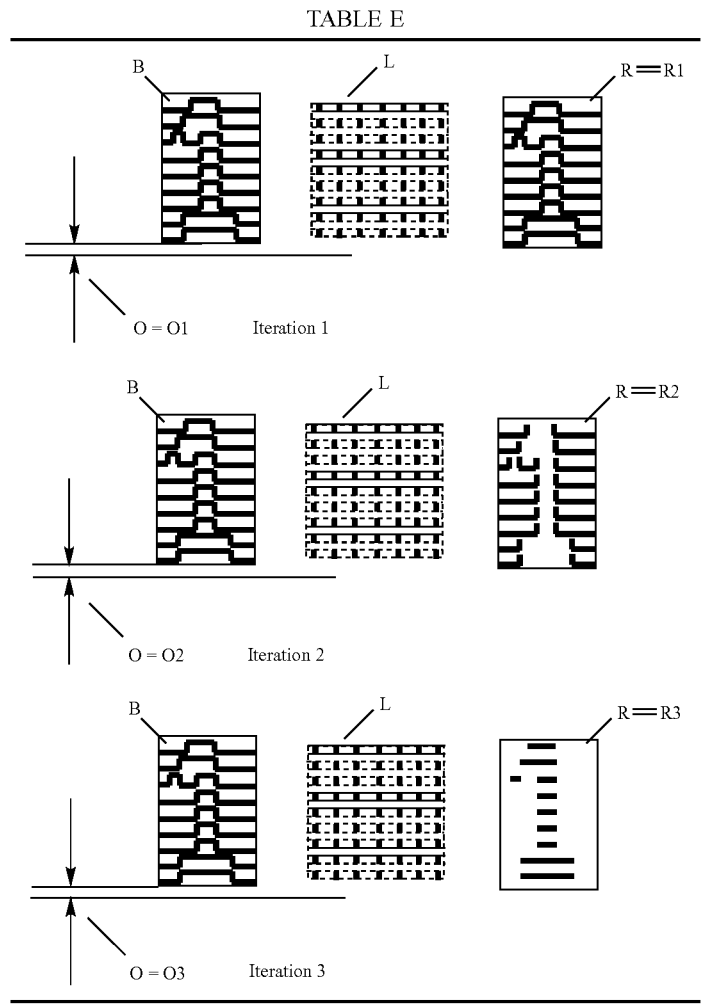

As illustrated by FIG. 5, in addition to the foregoing iterative scoring steps, the evaluation module 150 may also evaluate the accepted image using an image database which provides image descriptions in the form of predefined score function values that are matched by the evaluation module against the score function values that were calculated by the evaluation module (i.e. using steps 1–5 above).

(b) encryption means comprising means for applying a mathematical encryption function to said deflected image or a second said source image and producing an encrypted image; and, (c) means for overlaying said deflected and encrypted images to produce said security device image whereby neither of said first and second source images is visible upon viewing said security device image and wherein each of said deflected and encrypted images is preserved and identifiable by means of a predetermined feature distinct thereto such that either of said deflected and encrypted images may be decoded without interfering with an ability to separately decode the other of said deflected and encrypted images;

wherein said deflected image is configured for detecting therefrom said first source image by decoding by means of:
  (i) a physical lenticular lens corresponding to said software lens being manually applied to a printing of said security image; and/or,
  (ii) computer decoding processing applying said software lens to said deflected image, each said decoding means being selectable according to a user's choice without interference from any prior use of either or both said decoding means to detect said first source image; and, said encrypted image is configured for detecting therefrom either said deflected image or said second source image by means of computer decoding processing applying to said encrypted image a decryption function corresponding to said encryption function.

2. A system according to claim 1 wherein said security device image includes a plurality of said deflected images, each said deflected image produced from one of said source images, said deflected images being interlaced to form an interlaced deflected image and said interlaced deflected image being overlaid with said encrypted image.

3. A system according to claim 1 wherein said software lens is selected from the group comprising line lenses, curved lenses and bitmap lenses.

4. A computer operated system for detecting the presence of one or more latent source images within a security device image produced by a system according to claim 1 whereby said security device image comprises said overlaid deflected and encrypted images, said system for detecting comprising:
  (a) image separation means configured for separating said overlaid encrypted and deflected images according to said predetermined feature to provide a first deflected image according to said overlaid deflected image and said encrypted image;
  (b) decryption means comprising computer processing means for applying to said encrypted image said decryption function corresponding to said encryption function used to produce said encrypted image and producing therefrom a decrypted image, said decrypted image being either a second deflected image according to said overlaid deflected image or said second source image;
  (c) deflection decoding means comprising computer processing means for applying to said first deflected image, or to said decrypted image if said decrypted image is said second deflected image, a software lens corresponding to said software lens used to produce said overlaid deflected image, for aligning said software lens with said first deflected image, or said decrypted image, and for producing a decoded image from said applying; and,
  (d) output means for providing an output for use in characterizing said document as having been subject to data alteration or not,
  wherein said characterization is based on a comparison of said decoded image to said first source image.

5. A system for detecting according to claim 4 wherein said aligning means comprises evaluation means for evaluating whether said decoded image corresponds to said first source image, wherein said evaluation means operates iteratively with said applying means to apply on each iteration either a different position of said software lens or other different lens parameter, until either said decoded image is determined to correspond to said first source image or all available lens positions and/or parameters have been applied.

6. A system for detecting according to claim 5 wherein said evaluation means uses a scoring algorithm to calculate a score based on pixel statistics calculated for each iteratively produced deflection decoded image.

7. A system for detecting according to claim 6 wherein said decoded image is determined to correspond to said first source image when a relatively large change occurs in said score from one said iteration to the next.

8. A system for detecting according to claim 7 wherein said output comprises said decoded image when it has been determined to correspond to said first source image or an error message if no such determination is made.

9. A method for producing an electronic security device image from one or more electronic source images, said security device image being adaptable for printing onto a document to secure said document against data alteration, said method for producing comprising the steps:
  (a) applying a selected software lens to a first said source image and thereby producing a deflected image;
  (b) applying a mathematical encryption function to said deflected image or a second said source image and thereby producing an encrypted image;
  (c) overlaying said deflected and encrypted images and producing therefrom said security device image whereby neither of said first and second source images is visible upon viewing said security device image and wherein each of said deflected and encrypted images is preserved and identifiable by means of a predetermined feature distinct thereto such that either of said deflected and encrypted images may be decoded without interfering with an ability to separately decode the other of said deflected and encrypted images, whereby said deflected image is configured for detecting therefrom said first source image by decoding by means of:
  (i) a physical lenticular lens corresponding to said software lens being manually applied to a printing of said security image; and/or,
  (ii) computer decoding processing applying said software lens to said deflected image, each said decoding means being selectable according to a user's choice without interference from any prior use of either or both said decoding means to detect said first source image; and, said encrypted image is configured for detecting therefrom either said deflected image or said second source image by means of computer decoding processing applying to said encrypted image a decryption function corresponding to said encryption function.

10. A method according to claim 9 whereby a plurality of said deflected images are produced, each said deflected image produced from one of said source images, and interlaced to form an interlaced deflected image and said interlaced deflected image is overlaid with said encrypted image.

11. A method according to claim 10 whereby said software lens is selected from the group comprising line lenses, curved lenses and bitmap lenses.

12. A method for detecting the presence of one or more latent source images within a security device image produced by a method according to claim 9 whereby said security device image comprises said overlaid deflected and encrypted images, said method for detecting comprising the steps:

(a) separating said overlaid encrypted and deflected images according to said predetermined feature to provide a first deflected image according to said overlaid deflected image and said encrypted image;

(b) applying to said encrypted image said decryption function corresponding to the encryption function used to produce said encrypted image and producing therefrom a decrypted image, said decrypted image being either a second deflected image according to said overlaid deflected image or said second source image;

(c) applying to said first deflected image, or to said decrypted image if said decrypted image is said second deflected image, a software lens corresponding to said software lens used to produce said overlaid deflected image, and aligning said software lens with said first deflected image or said decrypted image, to produce decoded image; and, (d) characterizing said document as having been subject to data alternation or not, wherein said characterization is based on a comparison of said decoded image to said first source image.

13. A method for detecting according to claim 12 and further including iteratively evaluating whether said decoded image corresponds to said first source image by applying on each iteration either a different position of said software lens or other different lens parameter, until either said decoded image is determined to correspond to said first source image or all available lens positions and/or parameters have been applied.

14. A method for detecting according to claim 13 wherein a scoring algorithm is applied to calculate a score based on pixel statistics calculated for each iteratively produced decoded image.

15. A method according to claim 14 whereby said decoded image is determined to correspond to said first source image when a relatively large change occurs in said score from one said iteration to the next.

16. A method for detecting according to claim 15 and further comprising the step of displaying said decoded image when it has been determined to correspond to said first source image or providing an error message if no such determination is made.

17. A system according to claim 1 wherein said encryption function comprises a personal identifying feature of said document for personalization of said security device image to said document.

18. A system according to claim 17 wherein said personal identifying feature comprises an identification number of said document.

19. A system according to claim 1 wherein said predetermined feature is colour, wherein one colour is distinct to said deflected image and a different colour is distinct to said encrypted image.

20. A method according to claim 9 whereby a parameter defining said software lens is determined by pre-selected identifying data associated with said document for personalization of said security device image to said document.

21. A computer operated system for producing an electronic security device image from one or more electronic source images, said security device image being adaptable for printing onto a document to secure said document against data alteration, said system comprising:

(a) deflection encoding means comprising means for applying a selected software lens to a first said source image and producing a deflected image;

(b) encryption encoding means comprising means for applying a mathematical encryption function to said deflected image or a second said source image and producing an encrypted image; and, (c) means for overlaying said deflected and encrypted images to produce said security device image whereby neither of said first and second source images is visible upon viewing said security device image and wherein each of said deflected and encrypted images is preserved and identifiable by means of a predetermined feature distinct thereto such that either of said deflected and encrypted images may be decoded without interfering with an ability to separately decode the other of said deflected and encrypted images;

wherein said deflected image is configured for detecting therefrom, by computer decoding processing applying said software lens to said deflected image, said first source image; and, wherein said encrypted image is configured for detecting therefrom, by computer decoding processing applying to said encrypted image a decryption function corresponding to said encryption function, either said deflected image or said second source image.

22. A system according to claim 21 wherein said encryption function comprises a personal identifying feature of said document for personalization of said security device image to said document.

23. A system according to claim 22 wherein said personal identifying feature comprises an identification number of said document.

* * * * *

UNITED STATES PATENT AND TRADEMARK OFFICE
CERTIFICATE OF CORRECTION

| | | |
|---|---|---|
| PATENT NO. | : 7,046,804 B1 | Page 1 of 1 |
| APPLICATION NO. | : 09/553454 | |
| DATED | : May 16, 2006 | |
| INVENTOR(S) | : Trevor Merry and Ileana Buzuloiu | |

It is certified that error appears in the above-identified patent and that said Letters Patent is hereby corrected as shown below:

Column 14, line 11, delete "deflection".

Signed and Sealed this

Fifth Day of February, 2008

JON W. DUDAS
*Director of the United States Patent and Trademark Office*